Aug. 11, 1925.
G. H. CONDICT
1,548,824
RECOVERY OF ALCOHOL FROM ALCOHOLIC LIQUID
Filed March 13, 1922
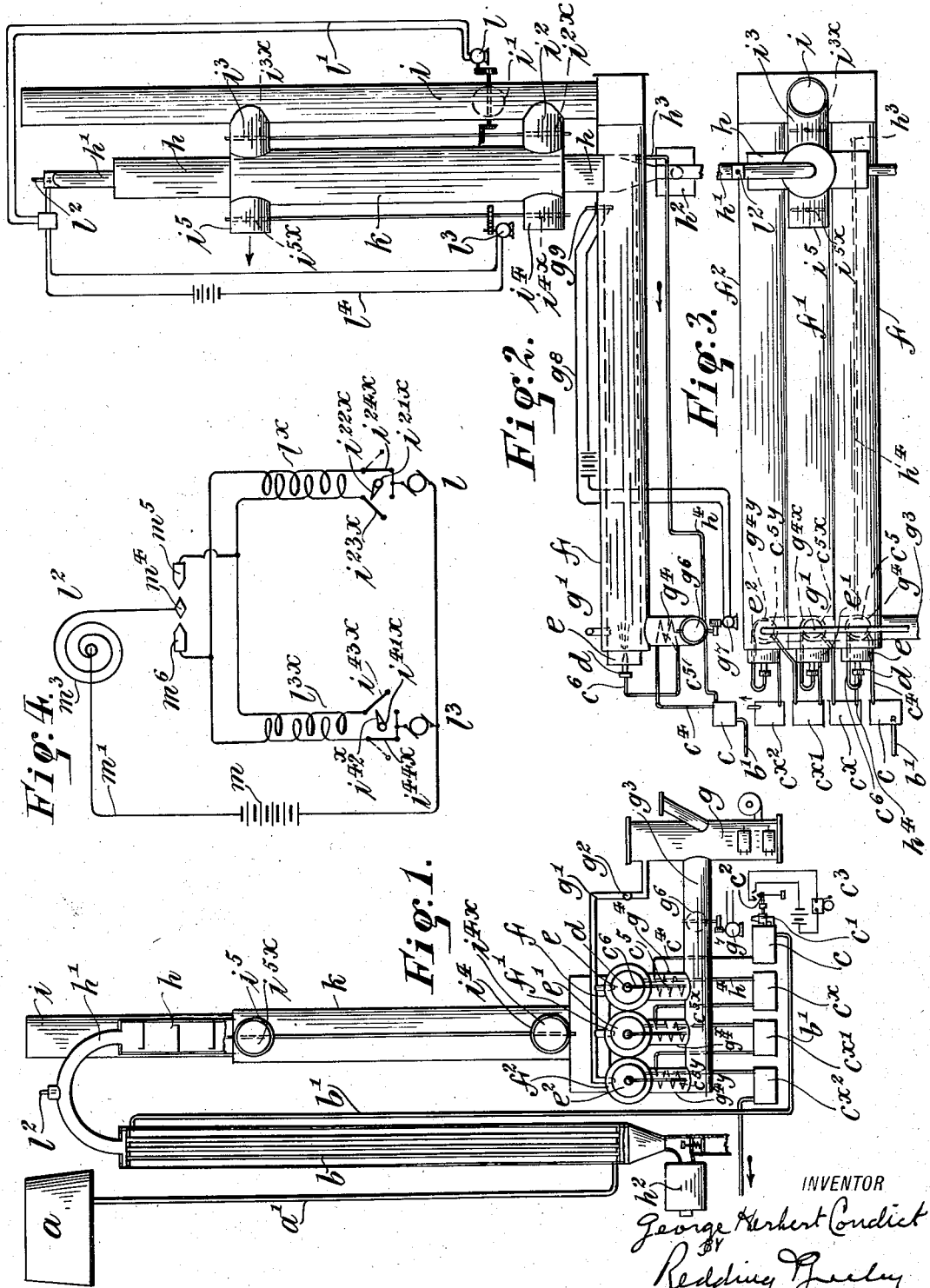
INVENTOR
George Herbert Condict
BY
Redding Greeley
ATTORNEYS Patented Aug. 11, 1925.

1,548,824

UNITED STATES PATENT OFFICE.

GEORGE HERBERT CONDICT, OF PLAINFIELD, NEW JERSEY.

RECOVERY OF ALCOHOL FROM ALCOHOLIC LIQUID.

Application filed March 13, 1922. Serial No. 543,163.

*To all whom it may concern:*

Be it known that I, GEORGE HERBERT CONDICT, a citizen of the United States, residing at Plainfield, in the State of New Jersey, have invented certain new and useful Improvements in the Recovery of Alcohol from Alcoholic Liquid, of which the following is a specification, reference being had to the accompanying drawing, forming a part hereof.

In another application, filed October 14, 1921, Ser. No. 507,642, there is described a method for the recovery of alcohol from alcoholic liquid in accordance with which the alcoholic liquid is introduced in a finely divided condition into an atmosphere at a temperature above the boiling point of the alcohol, whereby the alcohol is evaporated from the globules of alcoholic liquid and is subsequently condensed while the globules of residue liquid are permitted to coalesce and to be withdrawn. If the alcohol is to be denatured the atmosphere into which the alcoholic liquid is introduced is preferably itself a denaturant, being derived from the destructive distillation of wood or fibre or other suitable material. In the commercial development of the method disclosed in that application it has been found that economic advantage can be secured by improvements in details of operation and of apparatus which are set forth in the present application, the practice of the method, generally speaking, being carried on in substantially the same manner as described in said application. The invention will be explained more fully hereinafter with reference to the accompanying drawing in which it is illustrated and in which—

Figure 1 is a view in front elevation, partly in outline and diagrammatic, of the improved apparatus.

Figure 2 is a similar view in side elevation, with the furnace and pumps omitted.

Figure 3 is a top view of the same.

Figure 4 is a view of a detail to be referred to.

The beer, under which name the alcohol-containing liquid is commonly known in the art, whatever may be its specific character, is conducted from its source of supply, indicated at $a$, through a pipe $a'$, a pre-heater and condenser $b$ and a pipe $b'$ to a pump, sufficiently indicated at $c$, by which the beer is delivered under pressure into the chamber in which the evaporation of the alcohol is carried on. Since the successful practice of the method depends in part upon the maintenance of the predetermined pressure under which the beer is discharged into the evaporating atmosphere, the pump $c$ is provided with a regulator $c'$, of usual construction, not necessary to be described in detail, which may control, through a switch $c^2$, an electrical signalling device $c^3$, so that any substantial change in operating conditions, such as might be occasioned, for example, by the clogging of the nozzle hereinafter mentioned, shall make itself known at once.

From the pump $c$ the beer is delivered under pressure, through a pipe $c^4$, heating coil $c^5$ and pipe $c^6$ to an atomizing nozzle $d$ at one end of the evaporating chamber $e$ which is preferably formed as a cylinder of considerable length and is jacketed by a surrounding shell $f$ so that the temperature within the evaporating chamber $e$ can be maintained as hereinafter described.

A furnace $g$ of suitable construction, serving both to supply the denaturant atmosphere, if the alcohol is to be denatured, and the heat necessary to maintain the evaporating chamber at the required temperature, is connected through a pipe $g'$, provided with a regulating valve or damper $g^2$, to the evaporating chamber for the purpose of supplying thereto the denaturant atmosphere. The furnace $g$ is also connected through a pipe $g^3$ and pipe $g^4$ with the space between the shell $e$ and the shell $f$, so that the products of destructive distillation from the furnace may in part pass through such annular space and so maintain the desired temperature in the evaporating chamber $e$. The heating coil $c^5$ above mentioned may be located in the pipe $g^4$ and the pipe $g^3$ is preferably provided with a valve or damper $g^6$ for the purpose of regulating the passage of the hot products of destructive distillation through the pipe $g^3$. The valve or damper $g^6$ is operated in the usual manner by a motor, indicated at $g^7$, the operation of which is controlled, through an electric circuit $g^8$, from a thermostat $g^9$ which is influenced by the temperature at the outlet end of the evaporating chamber $e$.

The beer, initially heated in the pre-heater $b$ and brought to a relatively high temperature in the heating coil $c^5$, is discharged into the evaporating chamber $e$, through the atomizing nozzle $d$, as a fine spray or mist, so that the globules of the beer quickly give up their alcohol to the evaporating atmosphere, the alcohol being immediately denatured if the evaporating atmosphere has the quality of a denaturant. The alcoholic vapor passes from the evaporating chamber $e$, at its discharge end, into a dephlegmator $h$ of usual construction, from the upper end of which the partially condensed vapors pass through a pipe $h'$ to the pre-heater and condenser $b$ from the lower end of which the alcohol is discharged while the uncondensed vapors may be drawn off and the movement of the denaturant atmosphere into the evaporating chamber and the movement of the mingled alcoholic vapors and denaturant atmosphere therefrom may be promoted by a suitable suction fan indicated at $h^2$.

Such liquids as condense in the chamber $e$ may be drawn off at the bottom of the chamber, as indicated at $h^3$, and may be returned through a pipe $h^4$ to a second pump $c^x$ by which such liquids may be delivered, in the same manner as already described, to a second evaporating chamber $e'$ also connected to the dephlegmator $h$. In like manner condensed liquid from the end of the second evaporating chamber $e'$ and from the dephlegmator which receives the vapors from all of the evaporating chambers, may be returned, if necessary, to a third evaporating chamber $e^2$ through a pump $c^{x1}$. The liquids condensed in the third chamber $e^2$ may be discharged through a pump $c^{x2}$. The heated products of destructive distillation from the furnace $g$ are delivered through the header $g^3$ to the jackets $f$, $f'$ and $f^2$ of the respective evaporating chambers $e$, $e'$ and $e^2$, through pipes $g^{4x}$ and $g^{4y}$, in which are placed the heating coils $c^{5x}$ and $c^{5y}$ as previously described. The header pipe $g'$ may also be connected to the evaporating chambers $e'$ and $e^2$, as already described, for the purpose of delivering to them the denaturant atmosphere. By such means it is possible to recover substantially all of the alcoholic content of the alcohol-containing liquid which is under treatment.

The heated products of distillation, having given up much of their heat in their passage through the annular space between the evaporating chambers and the jackets, pass off through a pipe $i$ which is provided with a valve or damper $i'$. The pipe $i$ is also connected, as at $i^2$ and $i^3$, with a jacket $k$ around the dephlegmator $h$, the jacket being also provided with an air inlet and an air outlet, as at $i^4$ and $i^5$. Each of the connections $i^2$ and $i^3$ and the inlet and outlet $i^4$ and $i^5$ is provided with a valve or damper, sufficiently indicated by the corresponding reference character $i^{2x}$, $i^{3x}$, $i^{4x}$, $i^{5x}$. The valves or dampers at $i'$, $i^{2x}$ and $i^{3x}$ are regulated by a motor $l$ which, through an electrical circuit $l'$, is under the control of a thermostat indicated at $l^2$ in the pipe $h'$, while the valves or dampers $i^{4x}$ and $i^{5x}$ are similarly regulated by a motor $l^3$ under the control, through an electrical circuit $l^4$, of a thermostat at $l^5$. By such means it is possible to regulate to a nicety the temperature under which the dephlegmation of the alcoholic vapors is carried on.

The details of the thermostatic control form no part of the present invention, but in order that the operation may be understood the conventional representation in Figure 4, of the control of the dampers $i^{2x}$ and $i^{4x}$ will be explained briefly. From the source of current supply $m$, connection is made, as at $m'$, with one end of the sensitive member $m^3$ of the thermostat $l^2$, the movable end of such sensitive member carrying a contact $m^4$ which, by contact with the terminal $m^5$, under the influence of rising temperature, or with the terminal $m^6$ under the influence of falling temperature, closes the circuit in one direction through some of the field coils $l^x$ of the motor $l$ and in the opposite direction through some of the field coils $l^{3x}$, of the motor $l^3$, or through other of the field coils $l^x$ and $l^{3x}$, to drive the motors $l$ and $l^3$, in one direction or the other, to open the damper $l^{2x}$ and close the damper $l^{4x}$ or to close the damper $l^{2x}$ and open the damper $l^{4x}$, as conditions may require. The circuits are completed through the armatures of the respective motors in the usual manner. The shafts $i^{21x}$ and $i^{41x}$ of the respective dampers are armed with fingers $i^{22x}$ and $i^{42x}$ respectively, which act upon switches $i^{23x}$, $i^{24x}$, $i^{43x}$ and $i^{44x}$ to open or close the respective branches of the field coil circuits to start, stop and reverse the motors as conditions may require.

It will be understood that changes in details of operation, construction and arrangement will be made to suit different conditions and that the invention, except as pointed out in the claims, is not restricted to the particular construction shown and described herein.

I claim as my invention:

1. An apparatus for the recovery of alcohol from alcoholic liquid, which comprises a jacketed chamber, means for introducing into the chamber the alcoholic liquid in a finely divided condition, a furnace, means to conduct products of destructive distillation from the furnace to the chamber to supply a denaturant atmosphere, and means to conduct heat products from the furnace to the jacketed space about the chamber to maintain the chamber at a temperature above the boiling point of alcohol.

2. An apparatus for the recovery of alcohol from alcoholic liquid, which comprises a jacketed chamber, a furnace, means to conduct products of destructive distillation from the furnace to the chamber to supply a denaturant atmosphere, a pipe to conduct heat products from the furnace to the jacketed space about the chamber, and means for introducing into the chamber the alcoholic liquid in a finely divided condition, such means including a heating coil located in the pipe between the furnace and the jacketed space about the chamber.

3. An apparatus for the recovery of alcohol from alcoholic liquid, which comprises a jacketed chamber, means for introducing into the chamber the alcoholic liquid in a finely divided condition, a jacketed dephlegmator to receive the vapors from the chamber, means to supply heat to the jacketed space about the chamber, and means to direct the heat from the jacketed space about the chamber to the jacketed space about the dephlegmator.

4. An apparatus for the recovery of alcohol from alcoholic liquid, which comprises a jacketed chamber, means for introducing into the chamber the alcoholic liquid in a finely divided condition, a jacketed dephlegmator to receive the vapors from the chamber, means to supply heat to the jacketed space about the chamber, means to direct the heat from the jacketed space about the chamber to the jacketed space about the dephlegmator, a valve to control the passage of heat to the jacketed space about the dephlegmator and a thermostat subject to the temperature of the vapors which pass from the dephlegmator and operatively connected with said valve to regulate the same.

5. An apparatus for the recovery of alcohol from alcoholic liquid, which comprises a chamber, means for introducing into the chamber the alcoholic liquid in a finely divided condition, means for supplying heat to the chamber to maintain therein a temperature above the boiling point of alcohol, a jacketed dephlegmator to receive the vapors from the chamber, a valve to regulate the admission of air to the jacketed space about the dephlegmator and a thermostat subject to the temperature of the vapors which leave the dephlegmator and operatively connected with the said valve to regulate the same.

This specification signed this 10th day of March A. D. 1922.

GEORGE HERBERT CONDICT.